United States Patent
Gruschwitz et al.

(10) Patent No.: US 6,439,265 B1
(45) Date of Patent: Aug. 27, 2002

(54) SOLENOID VALVE WITH A CHECK VALVE

(75) Inventors: Peggy Gruschwitz, Stuttgart; Martin Oehler, Weinsberg; Heike Bauer, Stuttgart; Rolf Nicodemus, Bietigheim-Bissingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/715,017

(22) Filed: Nov. 20, 2000

(30) Foreign Application Priority Data

Nov. 20, 1999 (DE) .......................... 199 55 886

(51) Int. Cl.⁷ .................... F16K 31/06; B60T 8/36
(52) U.S. Cl. .................. 137/601.14; 137/601.2; 251/129.02; 251/129.15
(58) Field of Search .................. 251/129.01, 129.15, 251/129.02; 137/596.17, 601.14, 601.2; 303/119.1, 119.2

(56) References Cited

U.S. PATENT DOCUMENTS

| | | | | |
|---|---|---|---|---|
| 5,605,386 A | * | 2/1997 | Ziegler et al. | ........... 303/119.2 |
| 5,630,569 A | * | 5/1997 | Oehler et al. | .......... 251/129.15 |
| 5,673,980 A | * | 10/1997 | Schwarz et al. | ......... 303/119.2 |
| 5,735,582 A | * | 4/1998 | Eith et al. | .............. 137/596.17 |
| 5,810,330 A | * | 9/1998 | Eith et al. | ................. 303/119.2 |
| 5,865,213 A | * | 2/1999 | Scheffel et al. | ........ 251/129.15 |
| 6,084,493 A | * | 7/2000 | Siegel | ................... 251/129.15 |
| 6,189,985 B1 | * | 2/2001 | Fritsch et al. | ............ 303/119.2 |
| 6,254,199 B1 | * | 7/2001 | Megerle et al. | .......... 303/119.2 |
| 6,254,200 B1 | * | 7/2001 | Ganzel | .................... 303/119.2 |

* cited by examiner

Primary Examiner—George L. Walton
(74) Attorney, Agent, or Firm—Ronald E. Greigg

(57) ABSTRACT

A solenoid valve useful in a slip-controlled hydraulic brake system of a motor vehicle, and which has a seat valve disposed between a pressure fluid inlet and a pressure fluid outlet and in the bypass to the seat valve has a check valve with a quad ring as a closing body and a circular ring surface as a valve seat. Circularly disposed pressure fluid openings adjoin the circular ring surface and are overlapped on the radial inside and on the radial outside by respective sealing lips of the annular rubber-elastic closing body, which is guided with axial motion play in relation to the circular ring surface.

3 Claims, 1 Drawing Sheet

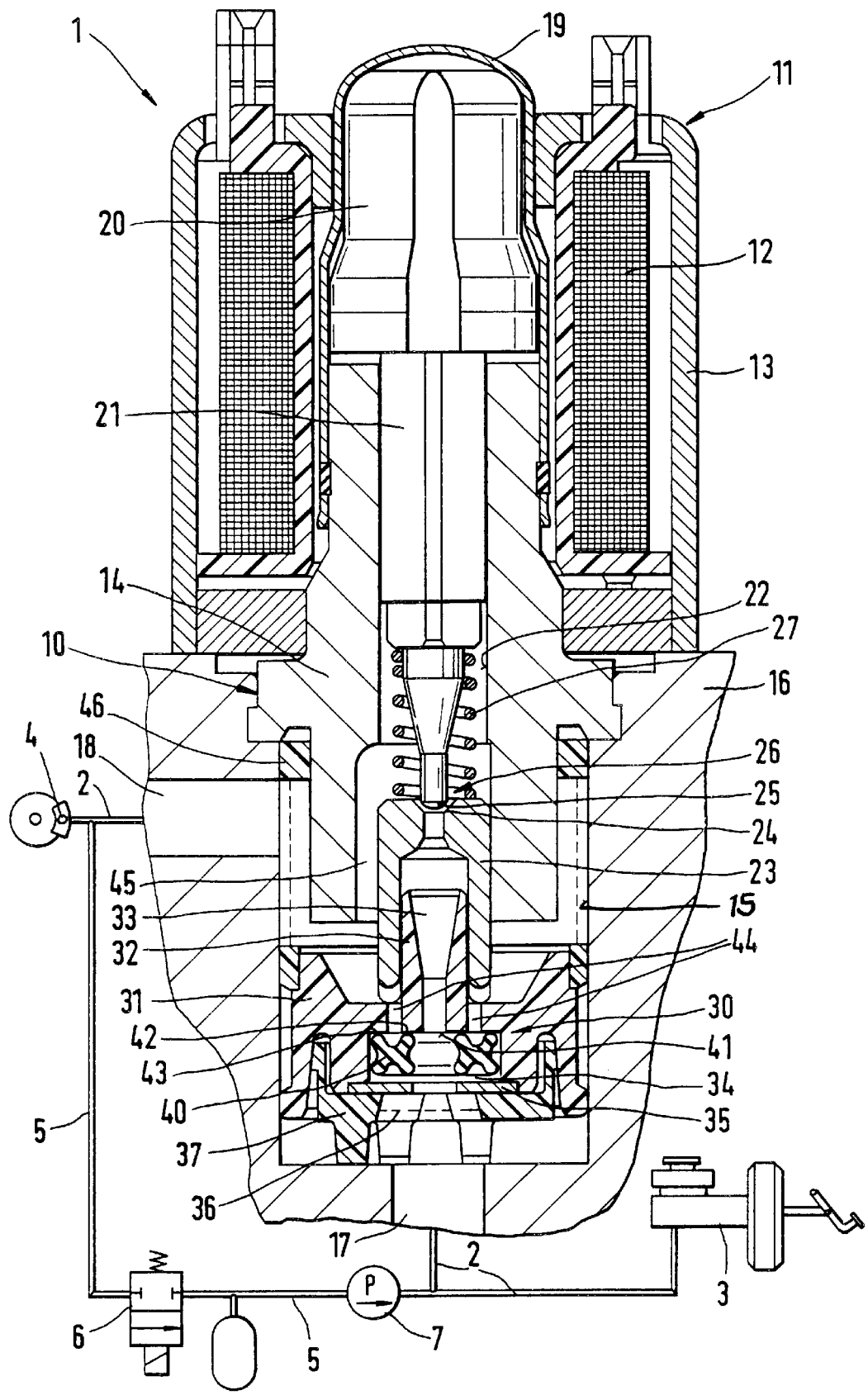

SOLENOID VALVE WITH A CHECK VALVE

BACKGROUND OF THE INVENTION

The invention is directed to solenoid valves, and more particularly to a solenoid valve incorporating an improved check valve.

DESCRIPTION OF THE PRIOR ART

A solenoid valve of the type with which this invention is concerned is disclosed in DE 196 35 690 A1, and in which the check valve has a rigid ball-shaped closing body, which is associated with a hollow conical valve seat in a valve component. Since the valve component is injection molded of thermoplastic synthetic resin or plastic material and has a non-uniform mass distribution, dimensional deviations of the valve seat occur during manufacture and during insertion with the solenoid valve into the housing of a hydraulic unit and these dimensional deviations lead to leakage problems in the check valve at low pressures.

SUMMARY OF THE INVENTION

The solenoid valve according to the invention is advantageous inasmuch as the elastic closing body reliably closes the check valve even at low pressures since the closing body is in a position to compensate for dimensional deviations of the valve seat even at low pressures.

In one embodiment of the solenoid valve, a pressure fluid path to the seat valve is predetermined, in relation to which the check valve is disposed in a geometrically favorable position. A large degree of dimensional fidelity in the manufacture of the valve seat of the check valve is achieved when the valve body is essentially rotationally symmetrical.

BRIEF DESCRIPTION OF THE DRAWING

The foregoing and other features and advantages of the invention will be apparent from the detailed description contained herein below, taken with the drawing in which the single FIGURE depicts the invention in simplified form.

DESCRIPTION OF THE PREFERRED EMBODIMENT

In a slip-controlled hydraulic motor vehicle brake system that is only partially shown, a solenoid valve 1 depicted in the sole FIGURE is disposed in a line connection 2 between a master cylinder 3 and a wheel brake cylinder 4. A second solenoid valve 6 and a pump 7 are disposed in a brake system 201 line connection 5 that bypasses the solenoid valve 1. The solenoid valve 1, which is open when without current, and the solenoid valve 6, which is closed when without current, are parts of an apparatus for slip-dependent modulation of the brake pressure acting in the wheel brake cylinder 4.

The solenoid valve 1 is comprised of two units: a hydraulic part 10 and an electric part 11, which is plug-connected to the hydraulic part. The electric part 11 is essentially comprised of a magnet coil 12 and a yoke 13. The hydraulic part 10 has a valve housing 14, which is fastened in a receiving bore 15 of a valve block 16 by means of a caulk connection. A pressure fluid inlet 17 that communicates with the master cylinder 3 feeds into the bottom of the receiving bore 15; in the circumference, a pressure fluid outlet 18 leads from the receiving bore and communicates with the wheel brake cylinder 4. Outside the valve block 16, a valve dome 19 that is enclosed by the electric part 11 is fastened to the valve housing 14. This valve dome 19 has a magnet armature 20 guided inside it in a longitudinally mobile fashion, which cooperates with a tappet 21. The tappet 21 extends in a through bore 22 of the valve housing 14 and this through bore 22 contains a sleeve-shaped valve body 23 remote from the valve dome. This valve body 23 has a valve seat 24 that communicates with the pressure fluid inlet 17. The valve seat 24 is associated with a closing member 25 embodied on the tappet 21. The valve seat 24 and the closing member 25 constitute a seat valve 26 which can be switched from its depicted open position into its closed position counter to the force of a restoring spring 27 through excitation of the magnet coil 12.

For a rapid brake pressure reduction in the wheel brake cylinder 4 and particularly for the case in which the solenoid valve 11 incorrectly remains in its closed position, a check valve 30 is provided, which is disposed in the bypass to the seat valve 26. To this end, the receiving bore 15 of the valve block 16, in the space disposed between the pressure fluid inlet 17 and pressure fluid outlet 18, contains a valve component 31, which fills the bore cross section and engages in the valve body 23 in a form-fitting manner by means of a central projection 32. The valve component 31, which is injection molded of a plastic, has an opening 33 extending in its longitudinal axis, which transitions into a circular cylindrical recess 34 remote from the projection. Toward the pressure fluid inlet 17 of the receiving bore 15, the recess 34 is closed by an annular disk 35 and a filter disk 36 in a closure part 37, which is slid onto the valve component 31 remote from the projection 32 and secures the annular disk 35 in position.

As a rubber-elastic closing body of the check valve 30, a so-called quad ring 40 is contained with axial motion play in the circular cylindrical recess 34 of the valve component 31. A valve seat of the check valve 30 is constituted by a circular ring surface 41 which defines the recess 34 on the side oriented toward the projection. Between a radially inner sealing lip 42 and a radially outer sealing lip 43 of the quad ring 40, a number of pressure fluid openings 44 of the valve component 31 lead from the circular ring surface 41 and are disposed running in a circular ring shape around the opening 33, extending parallel to the longitudinal axis of the valve component. Whereas the pressure fluid inlet 17 communicates with the seat valve 26 through the inner chamber of the quad ring 40 and the opening 33 of the valve component 31 passing through the center of the circular ring surface 41 of the recess 34 and also communicates with the pressure fluid outlet 18 through an opening 45 of the valve housing 14, after passing though a filter sleeve 36 that is slid onto the valve housing, when the check valve 30 is not closed, a pressure fluid-carrying connection is produced from the pressure fluid outlet 18, through the filter sleeve 36 that engages circumferentially around the rototationally symmetrical valve component 31, and on through the pressure fluid opening 44 and the inner chamber of the quad ring 40 to the pressure fluid inlet 17. The latter connection, however, is shut off by the engagement of the two sealing lips 42 and 43 of the quad ring 40 against the circular ring surface 41 of the valve component 31 when pressure fluid inlet 17 through the seat valve 26 to the pressure fluid outlet 18.

The foregoing relates to a preferred exemplary embodiment of the invention, it being understood that other variants and embodiments thereof are possible within the spirit and scope of the invention, the latter being defined by the appended claims.

We claim:

1. In a solenoid valve (1), particularly useful in slip-controlled hydraulic brake systems of motor vehicles, and having a seat valve (26) disposed between a pressure fluid inlet (17) and a pressure fluid outlet (18), and a bypass to the seat valve (26) having a check valve (30) disposed in the bypass, the check valve (30) having a closing body (40) which is in the form of a quad ring having at least two sealing lips (42, 43), and a valve component (31) that is injection molded of a plastic material, which valve component has a circular cylindrical recess (34) and a valve seat, the improvement wherein the valve seat includes a circular ring surface (41) that is adjoined by circularly disposed pressure fluid openings (44), which are overlapped on their radial inside and on their radial outside, and thus closed by respective sealing lips (42, 43) of the annular rubber-elastic closing body (40) when the closing body is in a closed position, pressure fluid is communicated between said inlet and said outlet through said seat valve (26) and the closing body is located in the circular cylindrical recess (34) to he guided thereby in an axial motion in relation to the circular ring surface (41) for moving said sealing lips (42, 43) from said pressure fluid openings (44), when pressure fluid is communicated from said outlet to said inlet, thus bypassing said seat valve (26).

2. The solenoid valve according to claim 1, wherein the valve component (31) has an opening (33) for pressure fluid, which leads from the center of the circular ring surface (41) and serves as the valve seat to the seat valve (26).

3. The solenoid valve according to claim 2, wherein the valve component (31) is essentially embodied as rotationally symmetrical.

* * * * *